United States Patent
Warmus et al.

(10) Patent No.: US 7,251,234 B2
(45) Date of Patent: Jul. 31, 2007

(54) APPARATUS AND METHODS FOR ACCESSING AN INFORMATION RESOURCE

(75) Inventors: James L. Warmus, LaGrange, IL (US); Michael B. Bengtson, Frankfort, IL (US)

(73) Assignee: R.R. Donnelley and Sons Company, Chicago, IL (US)

( * ) Notice: Subject to any disclaimer, the term of this patent is extended or adjusted under 35 U.S.C. 154(b) by 1099 days.

(21) Appl. No.: 10/219,185

(22) Filed: Aug. 15, 2002

(65) Prior Publication Data
US 2004/0192265 A1 Sep. 30, 2004

Related U.S. Application Data

(60) Provisional application No. 60/312,561, filed on Aug. 15, 2001.

(51) Int. Cl.
*H04Q 7/24* (2006.01)
*H04L 12/66* (2006.01)
*H04L 12/28* (2006.01)

(52) U.S. Cl. .................. 370/338; 370/353; 370/401
(58) Field of Classification Search ............... 370/352, 370/353
See application file for complete search history.

(56) References Cited

U.S. PATENT DOCUMENTS

| 6,577,873 B1 * | 6/2003 | Kim et al. ................. 455/503 |
| 6,647,277 B1 * | 11/2003 | Zicker et al. ............... 455/564 |
| 6,687,242 B1 * | 2/2004 | Enzmann et al. ........... 370/352 |
| 6,738,630 B2 * | 5/2004 | Ashmore ................. 455/456.3 |
| 6,829,233 B1 * | 12/2004 | Gilboy ....................... 370/352 |
| 6,842,612 B2 * | 1/2005 | Kalish et al. ............ 455/414.2 |
| 6,865,608 B2 * | 3/2005 | Hunter ....................... 709/229 |
| 6,999,444 B1 * | 2/2006 | Nitta et al. ................. 370/338 |
| 2002/0052912 A1 * | 5/2002 | Griswold et al. .......... 709/200 |
| 2002/0123904 A1 * | 9/2002 | Amengual et al. ............. 705/1 |
| 2004/0047341 A1 * | 3/2004 | Staack et al. ............... 370/352 |

* cited by examiner

*Primary Examiner*—Chau Nguyen
*Assistant Examiner*—Leibo Ding
(74) *Attorney, Agent, or Firm*—Hanley, Flight & Zimmerman, LLC

(57) ABSTRACT

Methods and apparatus for accessing websites from a communication device, such as a mobile telephone, that allows ease of access by initiating access to the website utilizing reference data such as a telephone number of an entity or business. A website server includes a telephone number cross reference database that allows the server to locate a website associated with the telephone number that is served by the server. Further features include automatic redirection to a website when the telephone of the entity or business is busy.

20 Claims, 4 Drawing Sheets

APPARATUS AND METHODS FOR ACCESSING AN INFORMATION RESOURCE

RELATED APPLICATION

This application claims priority from U.S. provisional patent application Ser. No. 60/312,561 filed Aug. 15, 2001.

BACKGROUND

The present disclosure relates generally to methods and apparatus for accessing an information resource such as a website and, more particularly, to dedicated access features for accessing the information resource via communication media.

Access of information resources, such as websites and their associated web pages by communication devices is typically accomplished via a communication medium using various communication protocols such as Internet Protocol and/or a Wireless application protocol (WAP). When accessing a web page, a user may enter a Uniform Resource Locator (URL) type address, either manually or via a hyperlink to the URL. Web page access may be made from a computer or from any other web enabled devices including web enabled telephones and Personal Data Assistants (PDA's). WAP, for example, is a predominant standard for presenting and delivering wireless information and telephony services on mobile phones and other wireless terminals. WAP operates on top of almost all wireless phone networks including those built under GSM and CDMA technologies. As discussed above, access of websites, including WAP websites, has typically included entering a URL type address of the WAP site desired into the mobile phone or terminal. A need exists for easier access of websites from web enabled communication devices, particularly from a mobile telephone or terminal.

DETAILED DESCRIPTION OF THE PREFERRED EXAMPLES

Added features to communication systems for facilitating website access, which will be discussed in connection with the following examples, include the ability to access a website by simply entering reference data characteristic of an entity or business into a communication device that normally facilitates communication by some other means to the entity, which is associated with the website. For example, a function may be added to and/or supplemented with the wireless application protocol (or an communication protocol) to access a WAP site by simply entering a telephone number of a business or entity wherein the WAP site of the business or entity may be accessed via the phone number also used for standard phone operation. Utilizing this feature, methods and apparatus are disclosed for providing web access with a communication device, such as an integrated mobile phone or other communication device (which may be mobile, for example, a personal digital assistant (PDA) or notebook computer, or stationary as, for example, a desktop PC) having a feature allowing a user to select either a standard mode of communication operation (e.g., voice telephone operation) or accessing a WAP site using a single code (i.e., non-voice telephone operation).

Figure 1:
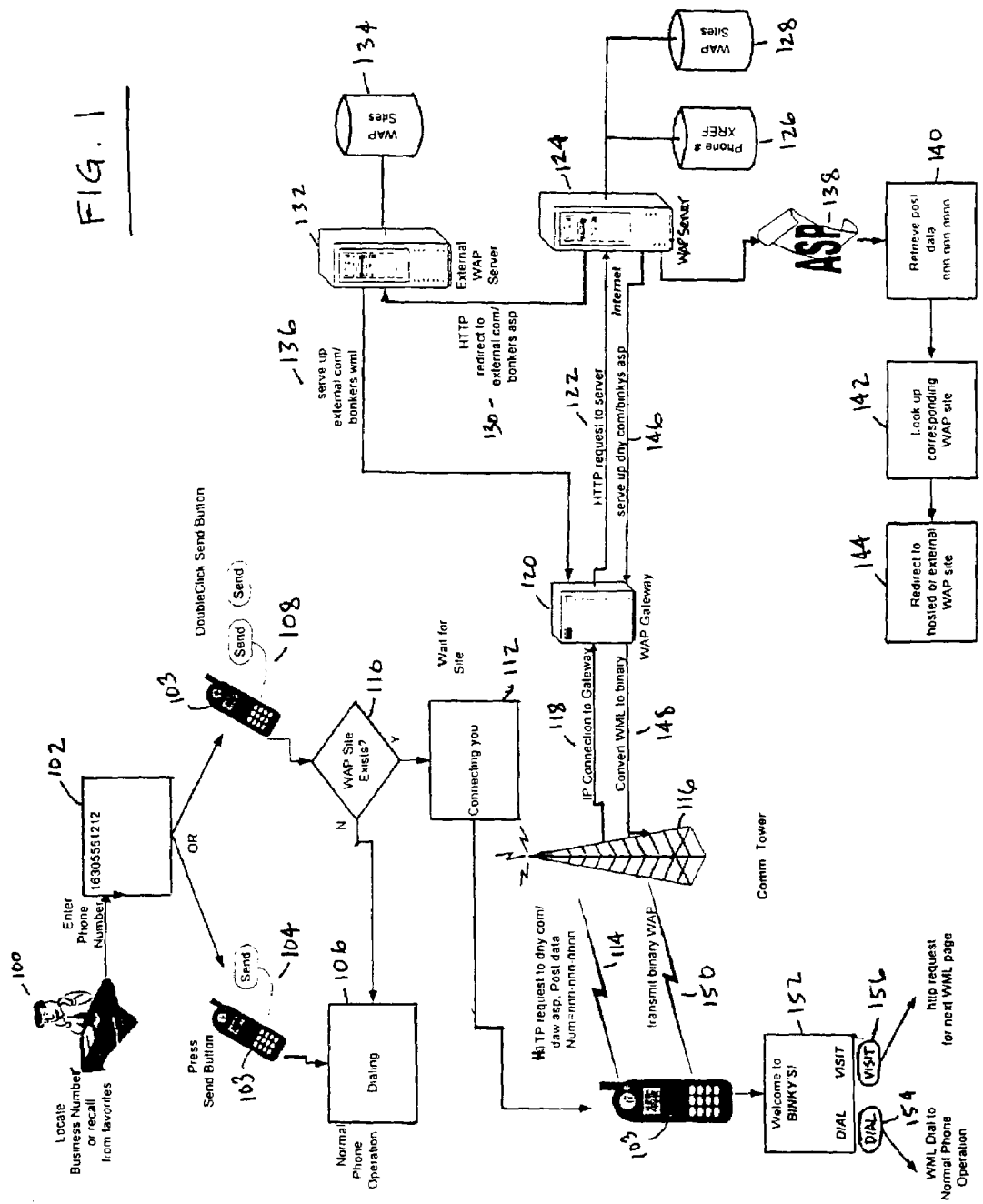
FIG. 1 is a diagrammatic illustration of a system for accessing a website, such as a WAP website, from a communication device having a integrated access feature.

FIG. 1 illustrates a system for accessing a website with a communication device wherein a user of the communication device (e.g., a computer, cell phone, PDA, etc.) first enters reference data that is characteristic of a particular business or entity. In the illustrated example, a user may locate reference data that is characteristic of a particular business or entity, such as a telephone number, recall the data or telephone number from stored favorites or locate the reference data using any other known means. The reference data (e.g., a telephone number, street address, etc.) is then entered into the mobile telephone or communication device 103 as shown at block 102. At this point the user of the communication device has the option of initiating standard communication (e.g., voice telephone communication) using the reference data or initiating communication with a potential website associated with the business or entity via the same reference data.

In the example illustrated in FIG. 1, the user has the option of either simply pushing the "SEND" button on the mobile telephone 103 as shown in function 104 to initiate normal phone operation dialing as illustrated at block 106 or double-clicking the "SEND" button as illustrated at function 108 to signal that access to a website (e.g., an HTML site, an I-MODE site, a WAP site, etc.) is desired. The means by which website access is selected at the communication device 103 may encompass keystrokes such as that shown in step 108 (e.g., double-clicking the "SEND") or may be effected by other means such as a dedicated button (e.g., a "WAPSEND" button), voice commands to voice recognition circuitry or a default automatic selection of website access, whereas normal operation (e.g., voice telephone operation) would require active selection to prevent automatic initiation of access to a WAP site.

A determination of whether a website (e.g., a WAP site in the illustrated example) exists as illustrated in decision block 110 does not take place necessarily at the communication device 103, but is determined through execution of the procedure that will described below. That is, a request is made to access one or more website servers (e.g., WAP servers 124 and 132) that serve websites and if no website is associated with the entered reference data, this information will be communicated back to the communication device in order to make complete determination of the query at block 110. Inherently, if a website access is returned to the communication device 103, the answer to the query at block 110 is affirmative. If the answer to query 110 is negative, indicated either by lack of a served-up website, website address or a distinct communication issued by the web server, normal operation of the communication device 103 may be initiated as shown in FIG. 1 (e.g., block 106 illustrating a phone call is automatically placed as if the "SEND" button was selected). Alternatively, the initiation of normal operation of the communication device 103 may also be manually directed.

According to the specific example illustrated in FIG. 1, when access to a website is initiated, a communication request according to a prescribed communication protocol is transmitted by the communication device 103. For example, the prescribed protocol could be a hypertext transfer protocol (HTTP) request that is transmitted by a mobile telephone or terminal referencing a predetermined WAP server address, although various other protocols could be used such as Wireless Application Protocol and/or Internet Protocol. The HTTP request may include posted data as illustrated in wireless transmission 114 such as the entered telephone number associated with the business or entity in order to locate a corresponding, associated website. A communication tower 116 connected to a WAP gateway 120 receives the transmitted HTTP request. It is noted that the transmission of the request is not limited to wireless transmission, but could be made over landline connections, for example, using one of various known gateways could be used with known protocols other than WAP. In the example of FIG. 1, the communication tower 116 is connected to the WAP gateway 120 via an Internet Protocol connection 118 and transmits the HTTP request to the WAP gateway 120. In the alternate, non-wireless examples, such as with a landline connection, the connection may be directly between the communication device 103 and a server (e.g., a server 124) and communication could be effected using various protocols such as Internet Protocol, for example.

Once the request is received at the WAP gateway 120, the gateway, in turn, sends the HTTP request to a server, such as a WAP server 124, via an Internet connection or other known type of network connection. Connected to the server 124 are a cross-reference database 126 and a website database, such as a WAP site database 128, for example. The cross-reference database 126 stores information correlating the reference data (e.g., a telephone number) to website data such as link information to the website of a business or entity associated with the reference data, which is stored in the website database 128. The server 124 utilizes the databases 126 and 128 through programming, such as Active Server Pages (ASP) 138, for example, that first retrieve the posted data transmitted in the original HTTP request as shown at block 140. Other server scripting or programming languages may be used other than ASP, such as PHP Hypertext Preprocessor (known by the recursive acronym PHP), to retrieve the posted data in the original HTTP request.

Through use of the Active Server Pages 138, website link information is looked up as shown at block 142 that corresponds to the reference data (e.g., the telephone number) that is included in the posted data. If an address of a website (e.g., a URL) corresponding to the reference data is stored in the WAP site database 128, this information may be served back to the communication device 103 to enable a user of the device 103 to access the particular website, whether it served by the server 124 or some other server. If a website is extant within the server 124, then the Active Server Page 138 may also simply redirect to the particular requested website address of the website that is hosted in the server 124 as indicated at block 144. A serve up 146, which may be an HTTP packet, is then sent by the server 124 to the gateway 120 providing access to the particular website associated with the reference data sent in the original request for access to a website associated with the reference data.

Alternatively, if no corresponding website link data or the website link is found but not served by the server 124 as determined at block 142 (e.g., it is determined that the server 124 does not internally host the particular requested website), the ASP 138 causes the server 124 to issue a redirect command 130, which may be an HTTP packet, to one or more external websites. In doing so, the server 124 redirects the HTTP request to an external server, such as an external WAP server 132, for example, that maintains the particular website associated with the reference data in the original HTTP request in its respective website database 134. When the particular requested website or website link data is accessed, a serve up signal 136, which may be an HTTP packet, is sent to the gateway 120 by the external server 132 providing access to the particular requested website or link data concerning the website (.e.g., a URL). As disclosed, the serve up signals 136 and 146 are transmitted as HTTP packets, but are not necessarily limited to such and may be transmitted using any one of various known protocols or programming languages, such as WAP and/or Wireless Mark-up Language (WML), for example.

The gateway 120 then serves the received HTTP packet (i.e., website data) to the communication device 103 of the user. The user, in turn, is then enabled to continuing browsing the website for additional web pages associated with the delivered website or additional websites. Alternatively, the user may initiate normal operation or communication. For example, in a wireless environment the user may initiate normal phone operation. As another example, in a landline environment the user may initiate Voice over IP communication instead of website browsing.

In the example of FIG. 1, when one of the serve up signals 136 or 146 is received by the WAP gateway 120 in Wireless Mark-up Language (WML), as an example of a wireless environment, the WAP gateway 120 will convert the WML to binary and send the binary WML data illustrated by step 148 to the communication tower 116. In turn, the communication tower 116 transmits the binary WML data concerning the desired website via wireless connection 150 to the user's communication device 103 (e.g., a mobile telephone or terminal). It is noted that other presentation languages may be utilized besides WML, such a I-MODE or CHTML, as examples. Furthermore, the server 124, for example, may also detect and format the presentation language based on the type of browser in the particular communication device 103.

As shown at block 152, the WAP site data (e.g., "Welcome to Binky's!" or data indicative of a website link) is visually displayed at the communication device 103 (i.e., a mobile telephone or terminal). Of course, audio prompts or content may be used instead of or in addition to visual displays. As discussed above, various further options may then be taken by the user such as dialing the normal phone of the requested business or entity as illustrated by step 154. Additionally, further HTTP requests may be made for subsequent WML pages associated with the requested WAP site as indicated by step 156.

Figure 2:
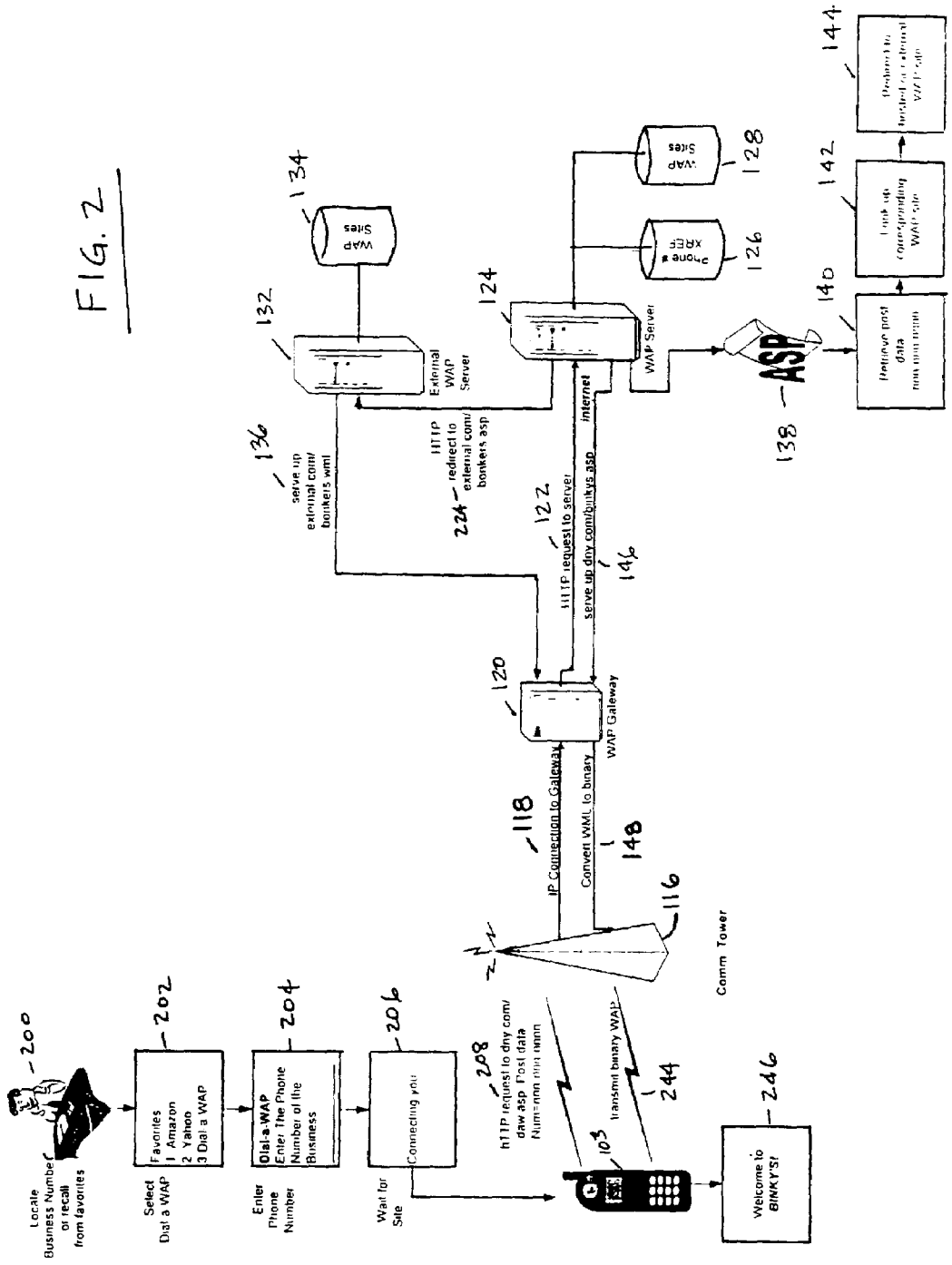
FIG. 2 is a diagrammatic illustration of a system for accessing a website via an Internet connection of a mobile terminal.

An further example of an automatic operation that may be implemented in the system of FIG. 1 includes an automatic request transmission for a website as soon as a valid telephone number (or some other reference data meeting predefined criteria) is entered into the communication device 103. Thus, as soon as the telephone number, for example, is entered, the communication device 103 initiates the website request automatically without any user prompting. The request follows the same procedure discussed above with either the server 124 or an external server (e.g., server 132) returning website data (e.g., a URL) to the communication device 103 before the device 103 presents a selection of either website access or normal communication to the user. Hence, the user of the communication device 103 is afforded A feature that may be optionally included with a wireless system, in particular, constructed according to the present disclosure is illustrated in FIG. 2. Specifically, an added feature of accessing a WAP website via an Internet connection may be utilized to connect to a particular WAP site. At initialization of a connection 200 shown in FIG. 2 a user may recall a web connection page containing a list of favorite Internet sites stored in the user's communication device 103. As an example, step 202 illustrates a list of favorites displayed to the user wherein the user may select the feature termed "Dial-a-WAP," which is an adopted nomenclature for the presently described feature.

Once the user has selected the WAP selection site, the user may enter the phone number of the business or entity desired as shown in step 204 or, alternatively, select a pre-stored telephone number from a business name or entity look-up on the website. Once the phone number has been entered, a connection procedure is initiated as illustrated in step 206 wherein an HTTP request 208 is transmitted via a wireless link to a communication tower 116 (although a cell phone is shown in FIG. 2 as the vehicle for effecting the wireless link, any other communication device (e.g., a PDA having a wireless modem) could be used in this role). Essentially, the remaining apparatus and procedure is similar to the previously described system of FIG. 1 and reference may be made to the previous discussion of FIG. 1 for details of the system. To facilitate the description, like reference numerals have been used for like structures and procedure in FIGS. 1 and 2. Of note, the transmission of the binary WML 244 corresponding to the particular WAP site accessed is finally displayed to the user as illustrated by frame 246. As with the system illustrated in FIG. 1, the user may then have options such as dialing the normal phone operation or issuing further HTTP requests for subsequent pages from the website or other websites. It is noted that the system in the example of FIG. 2 is not limited to wireless, and particularly WAP, applications, but may also may be applied to a landline environment, for example.

Figure 3:
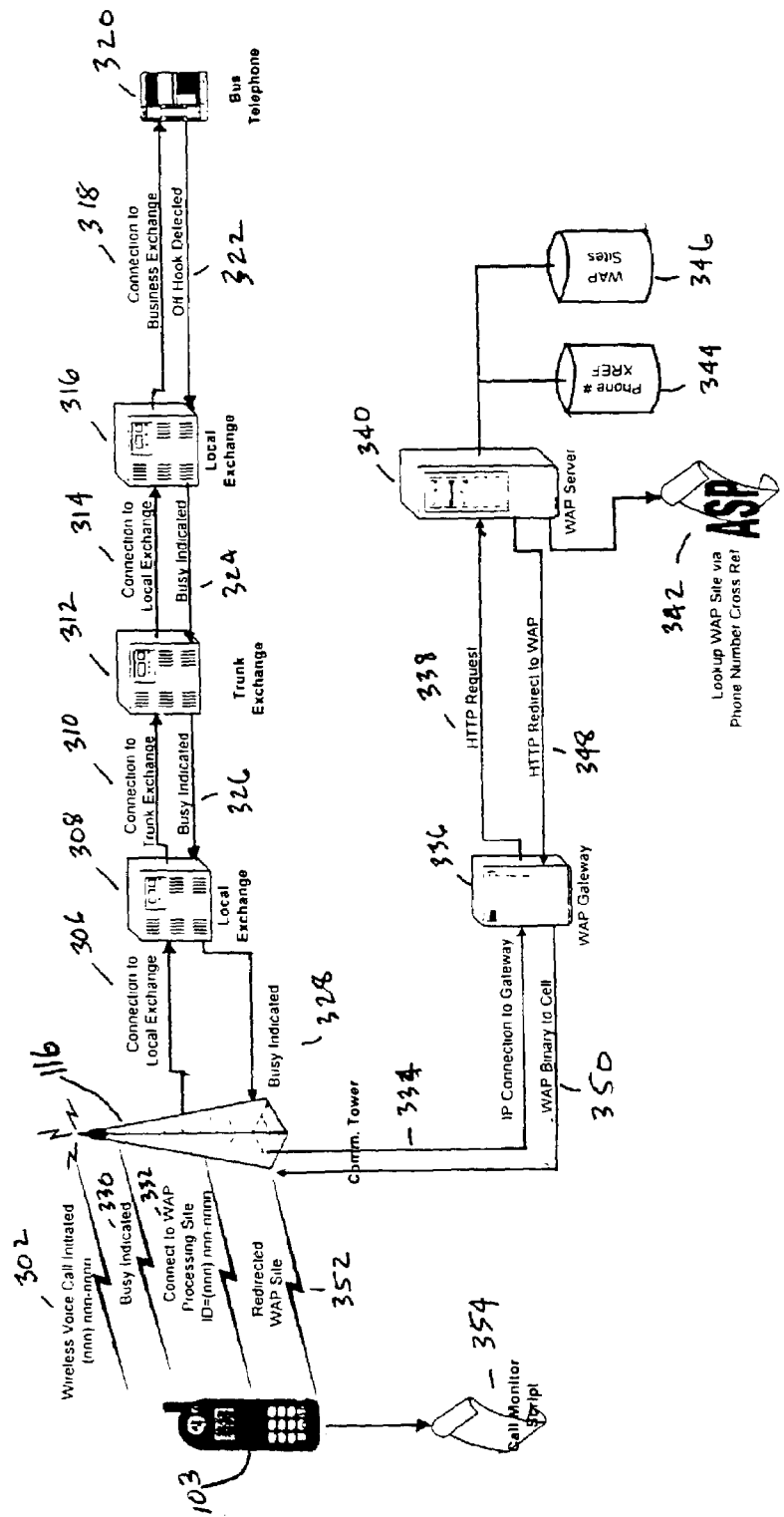
FIG. 3 is a diagrammatic illustration of a system for redirecting a voice call from a mobile terminal to a WAP site.

Another feature that may be included in a system constructed in accordance with the teachings of the present disclosure is illustrated in FIG. 3 wherein a user of a communication device 103, such as a mobile telephone, who has initiated communication to a business or entity (e.g., placing a phone call) is redirected to a website or WAP site when the phone or communication device of the business or entity that the user desires to reach is busy or unavailable.

As shown in the example of FIG. 3, when a user having a communication device (e.g., a mobile telephone or terminal) 103 wishes to place a normal phone operation voice call, a wireless voice call signal is initiated and transmitted by dialing the particular desired telephone number as shown in the wireless link 302. When the wireless signal is received at a communication tower 116 a connection 306 is established with a local exchange 308, which, in turn, has a connection 310 to a trunk exchange 312. A connection 314 is then initiated by the trunk exchange 312 to another local exchange 316, which is connected to the business or entity telephone 320 corresponding to the telephone number entered by the user at mobile telephone or terminal 103. When the telephone 320 is busy or "off-hook," such as when the telephone is in use, a busy or off-hook detection signal 322 is sent back to local exchange 316, which passes the busy signal via connection 324 and 326 through the trunk exchange 312 back to the local exchange 308. An busy indicated signal 328 is sent to the communication tower 116 for transmission of the busy indication through a wireless transmission 330 back to the mobile telephone or terminal 103.

Upon reception of a busy signal, the communication device 103 will either automatically or via a manual command by the user initiate a redirect request to connect with a web processing site (e.g., a web server or a WAP server 340) that has a database mapping website addresses to corresponding reference data (e.g., voice telephone numbers). This redirect request is sent via a wireless signal 332, for example, transmitted to a communication tower 116. Connected to the communication tower 116 via an Internet Protocol (IP) connection 334 is a gateway such as WAP gateway 336. As with the example of FIG. 1, the communication between the communication device 103 and the gateway 336, as well as communication between the communication device 103 and the local exchange 308 may alternatively be effected in landline systems, such as via a connection utilizing Internet Protocol.

Once the gateway 336 is in communication with the communication device 103, an HTTP request 338 for the website processing site (i.e., the web server) is transmitted via the communication tower 116 and IP connection 334 to the gateway 336, which, in turn, sends the HTTP request 338 to the a server (e.g. WAP server 340). Similar to the system operation described previously with respect to FIGS. 1 and 2, the WAP server 340 utilizes an Active Server Page 342 or other known server scripting to look up the particular requested website by utilizing reference data cross reference database 344 and website database 346 and to direct to the particular hosted website corresponding to the reference data (e.g., telephone number). Once the website has been looked up, the server 340 either serves up the website from database 346 and sends an HTTP packet 348 to the gateway 336, which then, in the case of a wireless system, converts the WML of the WAP site to WAP binary information for wireless transmission by the communication tower 116. The WAP binary information is then transmitted via a wireless link 352 to the mobile telephone or terminal 103. Alternately in the case of landline communication, the HTTP redirect packet 348 is passed on by the gateway 336 to the communication device 103 using any one of various known communication protocols. Once the signal is received by the mobile telephone 103 a call monitor script 354 is displayed on the mobile telephone or terminal 103 to the user similar to the scripts 152 and 246 shown in FIGS. 1 and 2, respectively. Although not illustrated in FIG. 3, the server 340 may also redirect to an external web server if the requested website is not contained in the server database 346, such as was previously described with respect to FIGS. 1 and 2.

Figure 4:
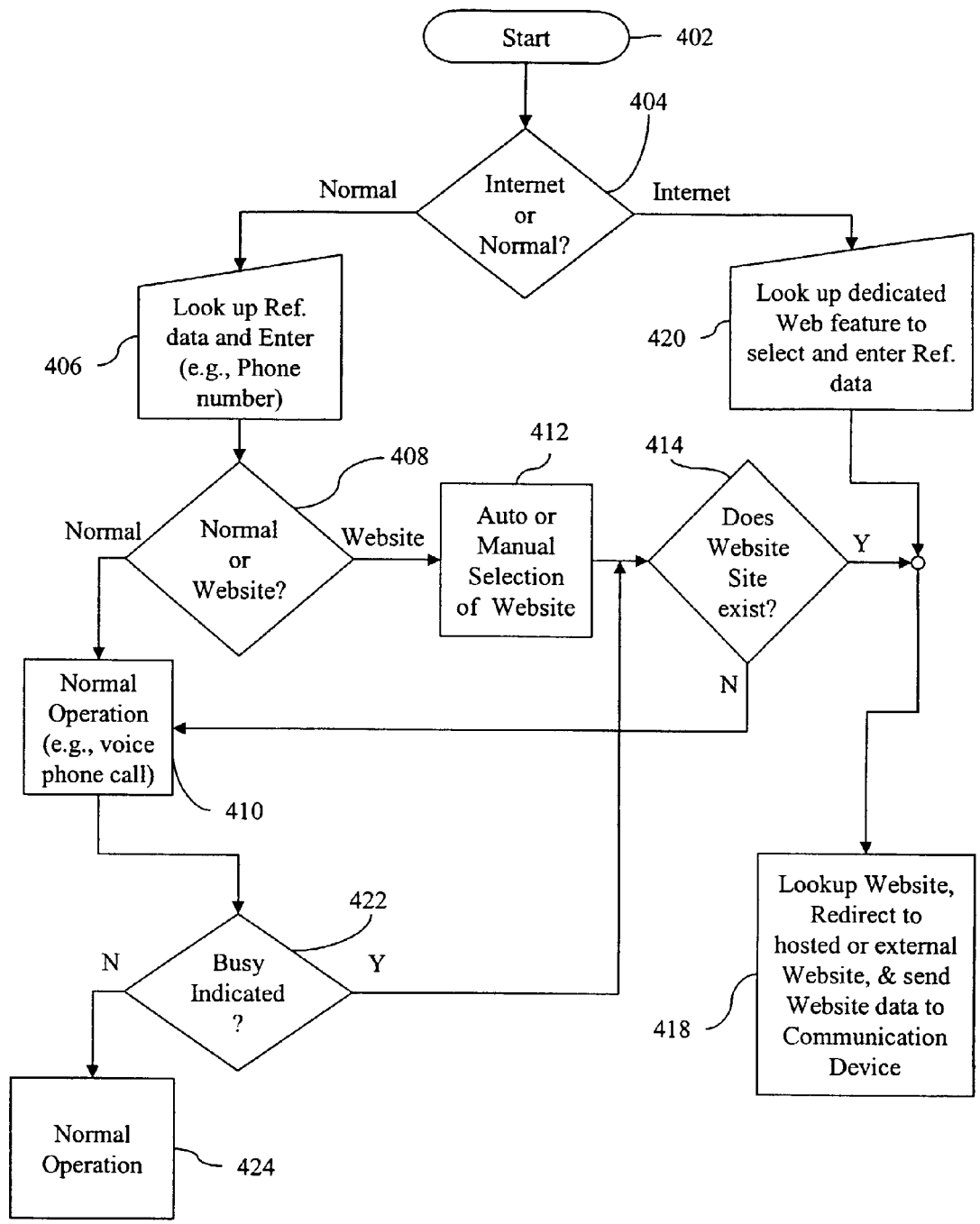
FIG. 4 is flow diagram illustrating operation of a system for accessing a website utilizing features of the systems disclosed in FIGS. 1–3.

FIG. 4 illustrates a flow diagram of an exemplary operation of a system employing the features disclosed in FIGS. 1, 2 and 3. According to the disclosed operation, after initialization at block 402, determination is made whether a user wishes to utilize Internet or normal operation using a particular communication device at decision block 404. Here, normal operation may be exemplified by normal wireless telephone operation or Internet phone operation, as examples. If normal operation is desired, the user then selects a desired reference data (e.g., telephone number) and enters the data as shown in block 406. Determination is then made whether normal phone operation is desired or if the user wishes to access a website as illustrated at decision block 408. This decision is similar to the decisions illustrated by reference numbers 100 and 102 in FIG. 1. If normal operation is desired, the communication device will proceed with normal operation and utilize the reference data to access an associated entity or business as indicated at block 410. Examples of such operation may include dialing a telephone number with a wireless telephone or Voice over IP using a landline system.

On the other hand, if a user desires to access a website as determined at block 408, flow proceeds to block 412 where either an automatic or, alternatively, a manual selection of website access is initiated. This process is akin to the procedure illustrated by reference number 108 in FIG. 1.

Next, a check as to whether a website exists for the particular entered reference data is performed at block 414, such as by sending an HTTP request to a website server, for example. If no website exists, flow reverts back to normal operation of the communication device at block 410. If a website is extant, the request that is sent to the server (either local or external server) is processed by the website server. As illustrated at block 418, the requested website is then looked up based on the input reference data and a redirect is performed to either a hosted or external website and sent to the communication device as previously explained with respect to FIG. 1.

If, at decision block 404 the user selects to access a website site via Internet operation, the user looks up a dedicated web feature such as the previously disclosed "Dial-a-WAP" discussed in connection with FIG. 2. Through the dedicated web feature the user may then enter the reference data of a business or entity at block 420 after which flow proceeds to block 418 where an HTTP request, for example, is then sent to a web server.

If during normal phone operation a busy signal is indicated as determined at block 422, the redirect feature as described with respect to FIG. 3 may be utilized where flow proceeds to block 414 for initiation of website access. Alternatively, if no busy is indicated, then normal operation of the communication device proceeds as indicated in block 424.

It is noted that the particular communication protocols disclosed are merely exemplary and other communication protocols known to those having skill in the art may be utilized with the presently disclosed method and apparatus and any known communication protocol could be utilized.

Although certain apparatus and methods have been described herein, the scope of coverage of this patent is not limited thereto. On the contrary, this patent covers all embodiments of the teachings of the invention fairly falling within the scope of the appended claims or under the doctrine of equivalents.

What is claimed is:

1. A method of accessing a web page from a web enabled telephone, the method comprising:
   receiving a phone number at the web enabled telephone;
   transmitting a voice call initiation message if a user of the web enabled telephone enters a first command, the voice call initiation message including first data indicative of the phone number;
   transmitting a web page request message if a user of the web enabled telephone enters a second command, the second command being different than the first command, the web page request message including second data indicative of the phone number; and
   transmitting the voice call initiation message in response to a determination that no web page is associated with the phone number in a predetermined database.

2. A method as defined in claim 1, further comprising determining a web page address based on the phone number.

3. A method as defined in claim 1, further comprising transmitting the web page request message in response to a determination that a busy signal is associated with the phone number.

4. A method as defined in claim 1, wherein the web enabled telephone is a Wireless Access Protocol (WAP) telephone.

5. A method as defined in claim 1, wherein the first command is entered when the user presses a button indicative of a send function.

6. A method as defined in claim 1, wherein the second command is entered when the user presses a button indicative of a send function twice.

7. A method as defined in claim 1, further comprising redirecting the web page request message to a web server.

8. A method of accessing a website comprising:
   receiving a telephone number within a web enabled telephone;
   transmitting a request for website link information concerning the website, which is associated with the telephone number, using the received telephone number;
   receiving a notification whether a website exists and the website link information concerning the website when the website exists;
   transmitting a voice call initiation message if a user of the web enabled telephone enters a first command, the voice call initiation message including first data indicative of the phone number;
   transmitting a webpage access command using the website link information if the user of the web enabled telephone enters a second command, the second command being different than the first command, the web page request message including second data indicative of the telephone number; and
   transmitting a voice call initiation message in response to a determination that no webpage is associated with the telephone number.

9. A method of serving a web page, the method comprising:
   receiving a web page request message from a web enabled telephone, the web page request message including data indicative of a phone number;
   determining a web page address based on the data indicative of the phone number;
   initiating a data transfer from a server associated with the web page address to the web enabled telephone; and
   transmitting a voice call initiation message in response to a determination that no webpage address is associated with the input phone number.

10. A method according to claim 9, further comprising:
    determining whether the web page exists on a local server that determines the web page address; and
    issuing a redirect command to an external server to initiate data transfer to the web enabled telephone when the web page does not exist on the local server.

11. A method according to claim 9, wherein server is used for determining the web page address based on the phone number and initiating the data transfer.

12. A method according to claim 9, wherein the web enabled telephone is selected from the group consisting of a mobile telephone, a personal digital assistant, a notebook computer and a desktop computer.

13. A method according to claim 9, further comprising determining a presentation language for the web page based on a detected type of browser.

14. An apparatus for accessing a web page comprising:
    a web enabled communication device configured to:
      receive an input phone number;
      transmit a voice call initiation message when a first command is initiated in the web enabled communication device using the input phone number;
      transmit a webpage request message when a second command different from the first command is initiated in the web enabled communication device to access a web page associated with the input phone number, the second command including data indicative of the phone number; and transmit a voice call initiation message in response to a determination that no webpage is associated with the input phone number.

15. An apparatus according to claim 14, wherein the web enabled communication device comprises a Wireless Access Protocol (WAP) telephone.

16. An apparatus for serving a web page comprising:

a web server configured to:

receive a webpage request from a web enabled communication device, for a webpage associated with an entity, the request including data indicative of a phone number associated with the entity;

determine whether the web server stores the webpage based on the data indicative of a phone number;

initiate data transfer of the webpage from the server to the web enabled communication device if the web server determines the webpage is stored by the web server; and cause a voice telephone call to be initiated in response to a determination that no webpage is associated with the input phone number.

17. An apparatus according to claim 16, wherein the web server is further configured to issue a redirect command to an external server to initiate data transfer from the external server to the web enabled communication device when the web server determines that it does not store the web page.

18. A method of accessing a web page from a web enabled telephone, the method comprising:

receiving a phone number at the web enabled telephone;

transmitting a voice call initiation message if a user of the web enabled telephone enters a first command, the voice call initiation message including first data indicative of the phone number;

transmitting a web page request message if a user of the web enabled telephone enters a second command, the second command being different than the first command, the web page request message including second data indicative of the phone number; and transmitting the web page request message in response to a determination that a busy signal is associated with the phone number.

19. A method as defined in claim 18, wherein the web enabled telephone is a Wireless Access Protocol (WAP) telephone.

20. A method as defined in claim 18, wherein the first command is entered when the user presses a button indicative of a send function.

\* \* \* \* \*